H. McCHESLEY.
ICE MAKING PLANT.
APPLICATION FILED JULY 18, 1907.
903,755.  Patented Nov. 10, 1908.
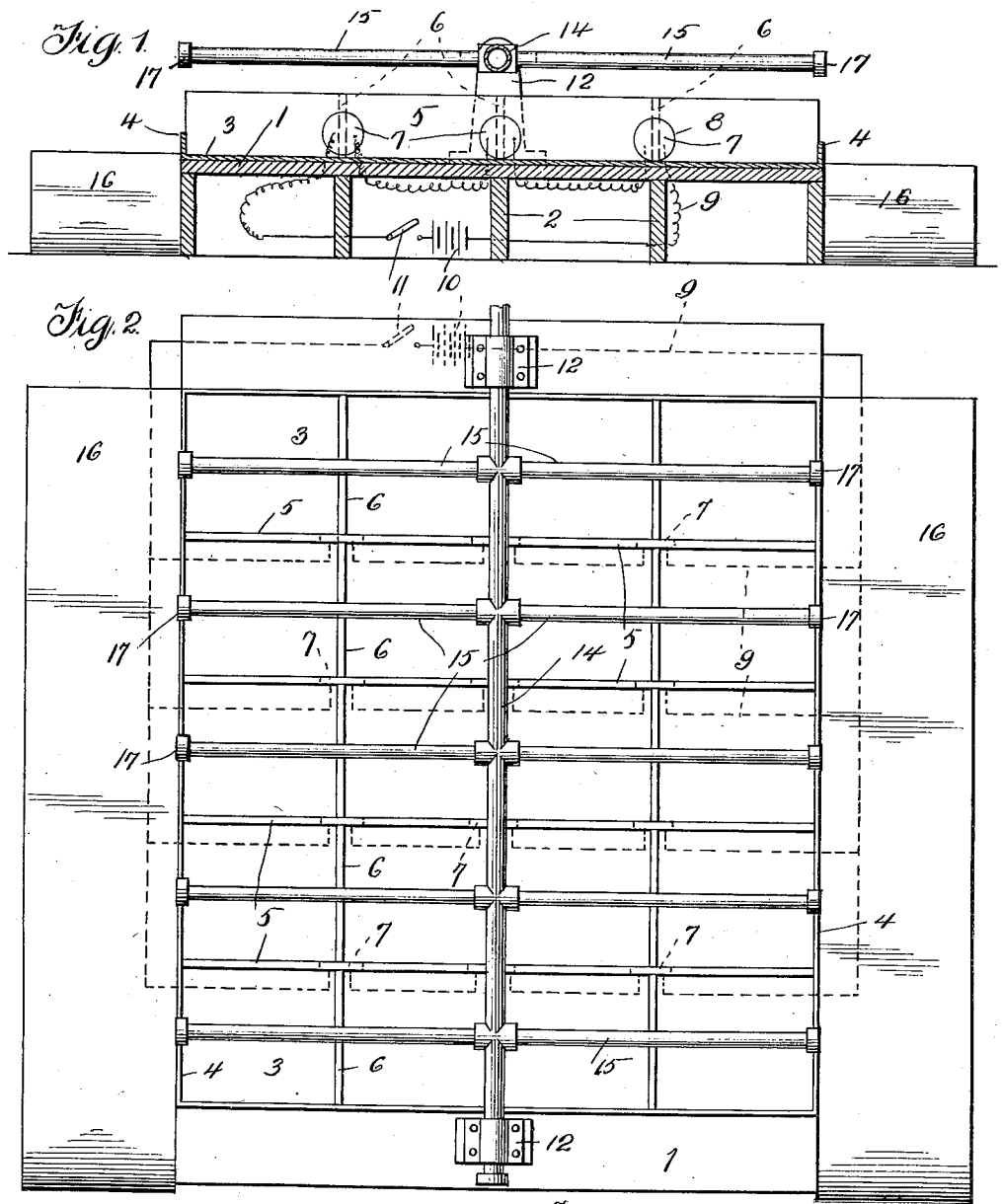
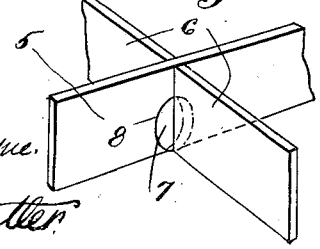
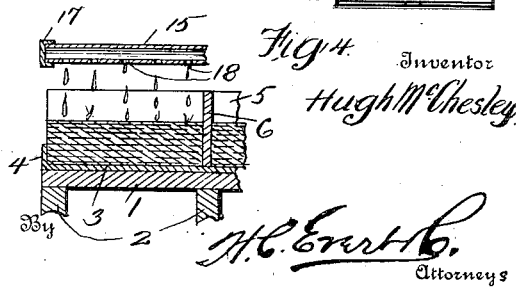

UNITED STATES PATENT OFFICE.

HUGH McCHESLEY, OF LIVERMORE, PENNSYLVANIA.

ICE-MAKING PLANT.

No. 903,755.

Specification of Letters Patent.

Patented Nov. 10, 1908.

Application filed July 18, 1907. Serial No. 384,461.

*To all whom it may concern:*

Be it known that I, HUGH McCHESLEY, a citizen of the United States of America, residing at Livermore, in the county of Westmoreland and State of Pennsylvania, have invented certain new and useful Improvements in Ice-Making Plants, of which the following is a specification, reference being had therein to the accompanying drawing.

This invention relates to improvements in an ice making plant, and the invention has for its object to provide a novel apparatus for sprinkling and collecting water, whereby water can congeal and freeze to produce ice.

My invention aims to provide an ice making plant or apparatus particularly designed for rural districts, where mountain streams are utilized during the winter for producing ice. In this connection my plant or apparatus is intended to continuously produce ice when the temperature of the apparatus is below freezing, the ice being removed from the plant or apparatus immediately after a sufficient thickness of ice has been obtained. To this end, I construct a portable platform upon which is arranged a plurality of partitions, these partitions dividing the platform according to the size of the cakes of ice to be formed. Over the platform is arranged a sprinkler frame for equally distributing water to the various compartments of the platform. Between the partitions or at advantageous points, I arrange explosive caps which are electrically controlled, the detonations of said caps being sufficient to vibrate the partitions and loosen the cakes of ice, whereby the cakes can be easily removed from the platform, the partitions replaced and the formation of ice continued.

The detailed construction entering into my invention will be presently described and then specifically pointed out in the appended claims.

In the drawings:—Figure 1 is a cross sectional view of the plant or apparatus, Fig. 2 is a plan of the same, Fig. 3 is a perspective view of a portion of the partitions of the apparatus, and Fig. 4 is a cross sectional view of a portion of the plant, illustrating the formation of ice.

The ice making plant or apparatus consists of a platform 1 supported in an elevated position by standards or beams 2. Upon the platform 1 is placed a metallic basin 3 having upwardly bent edges 4. In the basin 3 are arranged transverse partitions 5 and longitudinally disposed partitions 6, said partitions having their vertical edges contiguous to openings 7 formed in the partitions 5, these openings being provided for small explosive caps or torpedoes 8, connected by wires 9 to a battery 10, located adjacent to the plant or apparatus. The caps or torpedoes 8 are of a size as not to shatter the ice when exploded but of sufficient power to transmit the concussion to the partition 6 whereby the cakes of ice will be loosened from the partitions so that the cakes of ice can be removed. The electric current through the wires 9 is controlled by a conventional form of switch 11.

The ends of the platform 1 are provided with bearings 12 for a longitudinally disposed pipe 14 having outwardly extending branch pipes 15 overlying the platform 1. The pipes 14 and 15 constitute a frame for distributing water upon the basin 3 and these pipes can be fed from a spring, mountain stream or suitable source of good water. At the sides of the platform 1, I arrange inclined chutes or gangways 16 for removing the ice formed upon the basin.

As illustrated in Fig. 4 of the drawings, the pipes 14 and 15 are capped as at 17 and perforated as at 18 for equally distributing water upon the basin.

From the construction of the plant or apparatus it will be apparent that I have relied upon nature to freeze the water precipitated upon the basin 3, and I calculate that when the temperature of the atmosphere is below freezing point that the water will be frozen as fast as it is sprinkled upon the basin. Immediately upon the formation of ice reaching a desired thickness, the switch 11 can be closed, the caps or torpedoes 8 exploded, and the concussion is transmitted to the partitions which action will loosen the cakes of ice. These latter can be readily removed from the chutes or gangways to a storage house or plant.

The simplicity of construction permits of the apparatus being transported, or the parts thereof disassembled and stored away during the warm seasons of the year.

The apparatus or plant can be made upon a very large scale to produce a large quantity of ice by one flooding of the platform or in a short period of time.

Having fully described my invention, what I claim and desire to secure by Letters Patent, is:—

1. The combination with a suitable source of water supply, a platform, a basin carried by said platform, partitions arranged upon said basin, some of said partitions having openings formed therein, electrically detonated caps located in said openings, and a sprinkler frame arranged above said partitions and connecting with said supply of water.

2. An ice making plant embodying a platform, a basin carried thereby, partitions arranged in said basin, caps arranged in some of said partitions and between others, an electric battery for exploding said caps, whereby the concussion is transmitted to the partitions and the ice cakes loosened therefrom a sprinkler frame located over said partitions.

3. An ice making plant consisting of a basin, partitions arranged therein, a water sprinkling frame arranged above said partitions, and means located in some of said partitions for separating cakes of ice from said partitions.

In testimony whereof I affix my signature in the presence of two witnesses.

HUGH McCHESLEY.

Witnesses:
GEORGE HARBESON,
M. E. LEIGHNER.